(12) United States Patent
Bigioi et al.

(10) Patent No.: US 8,515,138 B2
(45) Date of Patent: Aug. 20, 2013

(54) IMAGE PROCESSING METHOD AND APPARATUS

(75) Inventors: Petronel Bigioi, Galway (IE); Peter Corcoran, Claregalway (IE); Eran Steinberg, San Francisco, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

(21) Appl. No.: 13/103,077

(22) Filed: May 8, 2011

(65) Prior Publication Data

US 2011/0235912 A1    Sep. 29, 2011

Related U.S. Application Data

(63) Continuation of application No. 13/034,707, filed on Feb. 25, 2011, which is a continuation of application No. 11/752,925, filed on May 24, 2007, now Pat. No. 7,916,971.

(51) Int. Cl.
G06K 9/00    (2006.01)

(52) U.S. Cl.
USPC ........... 382/118; 382/103; 382/115; 382/254; 382/275

(58) Field of Classification Search
USPC .................. 382/100, 115–118, 173, 181, 282
See application file for complete search history.

(56) References Cited

U.S. PATENT DOCUMENTS

| 4,047,187 | A | 9/1977 | Mashimo et al. |
| 4,317,991 | A | 3/1982 | Stauffer |
| 4,367,027 | A | 1/1983 | Stauffer |
| RE31,370 | E | 9/1983 | Mashimo et al. |
| 4,448,510 | A | 5/1984 | Murakoshi |
| 4,456,354 | A | 6/1984 | Mizokami |
| 4,638,364 | A | 1/1987 | Hiramatsu |
| 4,690,536 | A | 9/1987 | Nakai et al. |
| 4,796,043 | A | 1/1989 | Izumi et al. |
| 4,970,663 | A | 11/1990 | Bedell et al. |

(Continued)

FOREIGN PATENT DOCUMENTS

| EP | 1128316 A1 | 8/2001 |
| EP | 1626569 A1 | 2/2006 |

(Continued)

OTHER PUBLICATIONS

PCT International Preliminary Report on Patentability, Chapter I of the Patent Cooperation Treaty, for PCT Application No. PCT/US2007/069593, report dated Nov. 24, 2009, 4 pages.

(Continued)

*Primary Examiner* — Wesley Tucker
(74) *Attorney, Agent, or Firm* — Andrew V. Smith

(57) ABSTRACT

An image processing technique includes acquiring a main image of a scene and determining one or more facial regions in the main image. The facial regions are analysed to determine if any of the facial regions includes a defect. A sequence of relatively low resolution images nominally of the same scene is also acquired. One or more sets of low resolution facial regions in the sequence of low resolution images are determined and analysed for defects. Defect free facial regions of a set are combined to provide a high quality defect free facial region. At least a portion of any defective facial regions of the main image are corrected with image information from a corresponding high quality defect free facial region.

21 Claims, 4 Drawing Sheets

(56) References Cited

U.S. PATENT DOCUMENTS

| | | |
|---|---|---|
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,966,549 A | 10/1999 | Hara et al. |
| 5,978,519 A | 11/1999 | Bollman et al. |
| 5,991,456 A | 11/1999 | Rahman et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,360,021 B1 | 3/2002 | McCarthy et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 * | 10/2003 | Hong et al. .................. 382/118 |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,885,760 B2 | 4/2005 | Yamada et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,959,109 B2 | 10/2005 | Moustafa |
| 6,965,684 B2 | 11/2005 | Chen et al. |
| 6,977,687 B1 | 12/2005 | Suh |
| 6,993,157 B1 | 1/2006 | Oue et al. |
| 7,003,135 B2 | 2/2006 | Hsieh et al. |
| 7,020,337 B2 | 3/2006 | Viola et al. |
| 7,027,619 B2 | 4/2006 | Pavlidis et al. |
| 7,027,621 B1 | 4/2006 | Prokoski |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |

| | | | | | | |
|---|---|---|---|---|---|---|
| 7,038,709 B1 | 5/2006 | Verghese | | 2003/0107649 A1 | 6/2003 | Flickner et al. |
| 7,038,715 B1 | 5/2006 | Flinchbaugh | | 2003/0118216 A1 | 6/2003 | Goldberg |
| 7,039,222 B2 | 5/2006 | Simon et al. | | 2003/0123713 A1 | 7/2003 | Geng |
| 7,042,511 B2 | 5/2006 | Lin | | 2003/0123751 A1 | 7/2003 | Krishnamurthy et al. |
| 7,043,465 B2 | 5/2006 | Pirim | | 2003/0142209 A1 | 7/2003 | Yamazaki et al. |
| 7,050,607 B2 | 5/2006 | Li et al. | | 2003/0151674 A1 | 8/2003 | Lin |
| 7,057,653 B1 | 6/2006 | Kubo | | 2003/0169907 A1 | 9/2003 | Edwards et al. |
| 7,064,776 B2 | 6/2006 | Sumi et al. | | 2003/0202715 A1 | 10/2003 | Kinjo |
| 7,082,212 B2 | 7/2006 | Liu et al. | | 2004/0022435 A1 | 2/2004 | Ishida |
| 7,099,510 B2 | 8/2006 | Jones et al. | | 2004/0095359 A1 | 5/2004 | Simon et al. |
| 7,106,374 B1 | 9/2006 | Bandera et al. | | 2004/0120391 A1 | 6/2004 | Lin et al. |
| 7,106,887 B2 | 9/2006 | Kinjo | | 2004/0120399 A1 | 6/2004 | Kato |
| 7,110,569 B2 | 9/2006 | Brodsky et al. | | 2004/0170397 A1 | 9/2004 | Ono |
| 7,110,575 B2 | 9/2006 | Chen et al. | | 2004/0175021 A1 | 9/2004 | Porter et al. |
| 7,113,641 B1 | 9/2006 | Eckes et al. | | 2004/0179719 A1 | 9/2004 | Chen et al. |
| 7,119,838 B2 | 10/2006 | Zanzucchi et al. | | 2004/0218832 A1 | 11/2004 | Luo et al. |
| 7,120,279 B2 | 10/2006 | Chen et al. | | 2004/0223649 A1 | 11/2004 | Zacks et al. |
| 7,151,843 B2 | 12/2006 | Rui et al. | | 2004/0228505 A1 | 11/2004 | Sugimoto |
| 7,158,680 B2 | 1/2007 | Pace | | 2004/0264744 A1 | 12/2004 | Zhang et al. |
| 7,162,076 B2 | 1/2007 | Liu | | 2005/0013479 A1 | 1/2005 | Xiao et al. |
| 7,162,101 B2 | 1/2007 | Itokawa et al. | | 2005/0041121 A1 | 2/2005 | Steinberg et al. |
| 7,171,023 B2 | 1/2007 | Kim et al. | | 2005/0068446 A1 | 3/2005 | Steinberg et al. |
| 7,171,025 B2 | 1/2007 | Rui et al. | | 2005/0068452 A1 | 3/2005 | Steinberg et al. |
| 7,190,829 B2 | 3/2007 | Zhang et al. | | 2005/0069208 A1 | 3/2005 | Morisada |
| 7,194,114 B2 | 3/2007 | Schneiderman | | 2005/0089218 A1 | 4/2005 | Chiba |
| 7,200,249 B2 | 4/2007 | Okubo et al. | | 2005/0104848 A1 | 5/2005 | Yamaguchi et al. |
| 7,218,759 B1 | 5/2007 | Ho et al. | | 2005/0105780 A1 | 5/2005 | Ioffe |
| 7,227,976 B1 | 6/2007 | Jung et al. | | 2005/0140801 A1 | 6/2005 | Prilutsky et al. |
| 7,254,257 B2 | 8/2007 | Kim et al. | | 2005/0169536 A1 | 8/2005 | Accomazzi et al. |
| 7,274,822 B2 | 9/2007 | Zhang et al. | | 2005/0185054 A1 | 8/2005 | Edwards et al. |
| 7,274,832 B2 | 9/2007 | Nicponski | | 2005/0275721 A1 | 12/2005 | Ishii |
| 7,295,233 B2 | 11/2007 | Steinberg et al. | | 2006/0006077 A1 | 1/2006 | Mosher et al. |
| 7,315,630 B2 | 1/2008 | Steinberg et al. | | 2006/0008152 A1 | 1/2006 | Kumar et al. |
| 7,315,631 B1 | 1/2008 | Corcoran et al. | | 2006/0008173 A1 | 1/2006 | Matsugu et al. |
| 7,317,815 B2 | 1/2008 | Steinberg et al. | | 2006/0018517 A1 | 1/2006 | Chen et al. |
| 7,336,821 B2 | 2/2008 | Ciuc et al. | | 2006/0029265 A1 | 2/2006 | Kim et al. |
| 7,362,368 B2 | 4/2008 | Steinberg et al. | | 2006/0039690 A1 | 2/2006 | Steinberg et al. |
| 7,403,643 B2 | 7/2008 | Ianculescu et al. | | 2006/0050933 A1 | 3/2006 | Adam et al. |
| 7,408,581 B2 | 8/2008 | Gohda | | 2006/0093212 A1 | 5/2006 | Steinberg et al. |
| 7,440,593 B1 | 10/2008 | Steinberg et al. | | 2006/0098875 A1 | 5/2006 | Sugimoto |
| 7,515,740 B2 | 4/2009 | Corcoran et al. | | 2006/0098890 A1 | 5/2006 | Steinberg et al. |
| 7,612,794 B2 | 11/2009 | He et al. | | 2006/0120599 A1 | 6/2006 | Steinberg et al. |
| 7,620,214 B2 | 11/2009 | Chen et al. | | 2006/0140455 A1 | 6/2006 | Costache et al. |
| 7,636,485 B2 | 12/2009 | Simon et al. | | 2006/0147192 A1 | 7/2006 | Zhang et al. |
| 7,683,946 B2 | 3/2010 | Steinberg et al. | | 2006/0177100 A1 | 8/2006 | Zhu et al. |
| 7,692,696 B2 | 4/2010 | Steinberg et al. | | 2006/0177131 A1 | 8/2006 | Porikli |
| 7,738,015 B2 | 6/2010 | Steinberg et al. | | 2006/0203106 A1 | 9/2006 | Lawrence et al. |
| 7,764,311 B2 | 7/2010 | Bill | | 2006/0203107 A1 | 9/2006 | Steinberg et al. |
| 7,787,664 B2 * | 8/2010 | Luo et al. ............... 382/118 | | 2006/0203108 A1 | 9/2006 | Steinberg et al. |
| 7,868,922 B2 | 1/2011 | Ciuc et al. | | 2006/0204034 A1 | 9/2006 | Steinberg et al. |
| 7,916,971 B2 | 3/2011 | Bigioi et al. | | 2006/0204054 A1 | 9/2006 | Steinberg et al. |
| 7,965,875 B2 | 6/2011 | Ionita et al. | | 2006/0204055 A1 | 9/2006 | Steinberg et al. |
| 2001/0005222 A1 | 6/2001 | Yamaguchi | | 2006/0204056 A1 | 9/2006 | Steinberg et al. |
| 2001/0028731 A1 | 10/2001 | Covell et al. | | 2006/0204057 A1 | 9/2006 | Steinberg |
| 2001/0031142 A1 | 10/2001 | Whiteside | | 2006/0204058 A1 | 9/2006 | Kim et al. |
| 2001/0038712 A1 | 11/2001 | Loce et al. | | 2006/0204110 A1 | 9/2006 | Steinberg et al. |
| 2001/0038714 A1 | 11/2001 | Masumoto et al. | | 2006/0210264 A1 | 9/2006 | Saga |
| 2002/0090116 A1 | 7/2002 | Miichi et al. | | 2006/0215924 A1 | 9/2006 | Steinberg et al. |
| 2002/0105662 A1 | 8/2002 | Patton et al. | | 2006/0257047 A1 | 11/2006 | Kameyama et al. |
| 2002/0106114 A1 | 8/2002 | Yan et al. | | 2006/0268150 A1 | 11/2006 | Kameyama et al. |
| 2002/0114535 A1 | 8/2002 | Luo | | 2006/0269270 A1 | 11/2006 | Yoda et al. |
| 2002/0118287 A1 | 8/2002 | Grosvenor et al. | | 2006/0280380 A1 | 12/2006 | Li |
| 2002/0136433 A1 | 9/2002 | Lin | | 2006/0285754 A1 | 12/2006 | Steinberg et al. |
| 2002/0150662 A1 | 10/2002 | Dewis et al. | | 2006/0291739 A1 | 12/2006 | Li et al. |
| 2002/0168108 A1 | 11/2002 | Loui et al. | | 2007/0018966 A1 | 1/2007 | Blythe et al. |
| 2002/0172419 A1 | 11/2002 | Lin et al. | | 2007/0070440 A1 | 3/2007 | Li et al. |
| 2002/0176609 A1 | 11/2002 | Hsieh et al. | | 2007/0071347 A1 | 3/2007 | Li et al. |
| 2002/0181801 A1 | 12/2002 | Needham et al. | | 2007/0091203 A1 | 4/2007 | Peker et al. |
| 2002/0191861 A1 | 12/2002 | Cheatle | | 2007/0098303 A1 | 5/2007 | Gallagher et al. |
| 2003/0012414 A1 | 1/2003 | Luo | | 2007/0110305 A1 | 5/2007 | Corcoran et al. |
| 2003/0023974 A1 | 1/2003 | Dagtas et al. | | 2007/0116379 A1 | 5/2007 | Corcoran et al. |
| 2003/0025812 A1 | 2/2003 | Slatter | | 2007/0116380 A1 | 5/2007 | Ciuc et al. |
| 2003/0035573 A1 | 2/2003 | Duta et al. | | 2007/0122056 A1 | 5/2007 | Steinberg et al. |
| 2003/0048950 A1 | 3/2003 | Savakis et al. | | 2007/0133901 A1 | 6/2007 | Aiso |
| 2003/0052991 A1 | 3/2003 | Stavely et al. | | 2007/0154095 A1 | 7/2007 | Cao et al. |
| 2003/0059107 A1 | 3/2003 | Sun et al. | | 2007/0154096 A1 | 7/2007 | Cao et al. |
| 2003/0059121 A1 | 3/2003 | Savakis et al. | | 2007/0160307 A1 | 7/2007 | Steinberg et al. |
| 2003/0071908 A1 | 4/2003 | Sannoh et al. | | 2007/0189606 A1 | 8/2007 | Ciuc et al. |
| 2003/0084065 A1 | 5/2003 | Lin et al. | | 2007/0189748 A1 | 8/2007 | Drimbarean et al. |

| | | | |
|---|---|---|---|
| 2007/0189757 | A1 | 8/2007 | Steinberg et al. |
| 2007/0201724 | A1 | 8/2007 | Steinberg et al. |
| 2007/0201725 | A1 | 8/2007 | Steinberg et al. |
| 2007/0201750 | A1 | 8/2007 | Ito et al. |
| 2007/0237421 | A1* | 10/2007 | Luo et al. .................. 382/284 |
| 2007/0269108 | A1 | 11/2007 | Steinberg et al. |
| 2007/0296833 | A1 | 12/2007 | Corcoran et al. |
| 2008/0013798 | A1 | 1/2008 | Ionita et al. |
| 2008/0037827 | A1 | 2/2008 | Corcoran et al. |
| 2008/0037838 | A1 | 2/2008 | Ianculescu et al. |
| 2008/0037839 | A1 | 2/2008 | Corcoran et al. |
| 2008/0037840 | A1 | 2/2008 | Steinberg et al. |
| 2008/0043122 | A1 | 2/2008 | Steinberg et al. |
| 2008/0049970 | A1 | 2/2008 | Ciuc et al. |
| 2008/0055433 | A1 | 3/2008 | Steinberg et al. |
| 2008/0075385 | A1 | 3/2008 | David et al. |
| 2008/0144966 | A1 | 6/2008 | Steinberg et al. |
| 2008/0175481 | A1 | 7/2008 | Petrescu et al. |
| 2008/0205712 | A1 | 8/2008 | Ionita et al. |
| 2008/0240555 | A1 | 10/2008 | Nanu et al. |
| 2009/0052750 | A1 | 2/2009 | Steinberg et al. |

FOREIGN PATENT DOCUMENTS

| | | |
|---|---|---|
| EP | 1887511 A1 | 2/2008 |
| GB | 2370438 A1 | 6/2002 |
| JP | 5260360 A2 | 10/1993 |
| JP | 09-212620 A | 8/1997 |
| JP | 2005-164475 A2 | 6/2005 |
| JP | 2006-005662 A2 | 1/2006 |
| JP | 2006-254358 A2 | 9/2006 |
| JP | 2007-087234 A | 4/2007 |
| WO | WO02052835 A2 | 7/2002 |
| WO | WO2007095477 A2 | 8/2007 |
| WO | WO2007095477 A3 | 8/2007 |
| WO | WO2007095483 A2 | 8/2007 |
| WO | WO2007095553 A2 | 8/2007 |
| WO | WO2007095553 A3 | 8/2007 |
| WO | WO2007142621 A1 | 12/2007 |
| WO | WO2008015586 A2 | 2/2008 |
| WO | WO2008015586 A3 | 2/2008 |
| WO | WO2008018887 A1 | 2/2008 |
| WO | WO2008023280 A2 | 2/2008 |
| WO | WO2008104549 A2 | 9/2008 |
| WO | WO2008150285 A1 | 12/2008 |

OTHER PUBLICATIONS

T.F. Cootes, G. J. Edwards, C. J. Taylor, Active Appearance Models, Proceedings of the European Conference on Computer Vision, 1998, pp. 484-498.

Fadi Dornaika and Jorgen Ahlberg, Fast and Reliable Active Appearance Model Search for 3-D Face Tracking, IEEE Transactions on Systems, Man and Cybernetics—Part B: Cybernetics, 2004, vol. 34 (4), pp. 1838-1853.

Aoki, Hiroyuki et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICPR '00), 2000, vol. 2.

Batur et al., "Adaptive Active Appearance Models", IEEE Transactions on Image Processing, 2005, pp. 1707-1721, vol. 14—Issue 11.

Beraldin, J.A. et al., "Object Model Creation from Multiple Range Images: Acquisition, Calibration, Model Building and Verification, Abstract printed from http://csdl.computer.org/comp/proceedings/nrc/1997/7943/00/79430326abs.htm", International Conference on Recent Advances in 3-D Digital Imaging and Modeling, 1997.

Beymer, David, "Pose-Invariant face Recognition Using Real and Virtual Views, A.I. Technical Report No. 1574", Massachusetts Institute of Technology Artificial Intelligence Laboratory, 1996, pp. 1-176.

Bradski Gary et al., "Learning-Based Computer Vision with Intel's Open Source Computer Vision Library", Intel Technology, 2005, pp. 119-130, vol. 9—Issue 2.

Buenaposada, J., "Efficiently estimating 1-3,16 facial expression and illumination in appearance-based tracking, Retrieved from the Internet: URL:http://www.bmva.ac.uk/bmvc/2006/ > [retrieved on Sep. 1, 2008]", Proc. British machine vision conference, 2006.

Chang, T., "Texture Analysis and Classification with Tree-Structured Wavelet Transform", IEEE Transactions on Image Processing, 1993, pp. 429-441, vol. 2—Issue 4.

Cootes T. et al., "Modeling Facial Shape and Appearance, S. Li and K. K. Jain (Eds.): "Handbook of face recognition", XP002494037", 2005, Chapter 3, Springer.

Cootes, T.F. et al., "A comparative evaluation of active appearance model algorithms", Proc. 9th British Machine Vision Conference. British Machine Vision Association, 1998, pp. 680-689.

Cootes, T.F. et al., "On representing edge structure for model matching", Proc. IEEE Computer Vision and Pattern Recognition, 2001, pp. 1114-1119.

Corcoran, P. et al., "Automatic Indexing of Consumer Image Collections Using Person Recognition Techniques", Digest of Technical Papers. International Conference on Consumer Electronics, 2005, pp. 127-128.

Costache, G. et al., "In-Camera Person-Indexing of Digital Images", Digest of Technical Papers. International Conference on Consumer Electronics, 2006, pp. 339-340.

Crowley, J. et al., "Multi-modal tracking of faces for video communication, http://citeseer.ist.psu.edu/crowley97multimodal.html", In Computer Vision and Patent Recognition, 1997.

Dalton, John, "Digital Cameras and Electronic Color Image Acquisition, Abstract printed from http://csdl.computer.org/comp/proceedings/compcon/1996/7414/00/74140431abs.htm", COMPCON Spring '96—41st IEEE International Conference, 1996.

Demirkir, C. et al., "Face detection using boosted tree classifier stages", Proceedings of the IEEE 12th Signal Processing and Communications Applications Conference, 2004, pp. 575-578.

Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.

Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.

Edwards, G.J. et al., "Learning to identify and track faces in image sequences, Automatic Face and Gesture Recognition", IEEE Comput. Soc, 1998, pp. 260-265.

Feraud, R. et al., "A Fast and Accurate Face Detector Based on Neural Networks", IEEE Transactions on Pattern Analysis and Machine Intelligence, 2001, pp. 42-53, vol. 23—Issue 1.

Fernandez, Anna T. et al., "Synthetic Elevation Beamforming and Image Acquisition Capabilities Using an 8×128 1.75D Array, Abstract Printed from http://www.ieee-uffc.org/archive/uffc/trans/toc/abs/03/t0310040.htm", The Technical Institute of Electrical and Electronics Engineers.

Final Office Action mailed Nov. 18, 2009, for U.S. Appl. No. 11/554,539, filed Oct. 30, 2006.

Froba, B. et al., "Face detection with the modified census transform", Proceedings of the Sixth IEEE International Conference on Automatic Face and Gesture Recognition, 2004, pp. 91-96.

Froba, B. et al., "Real time face detection, Kauai, Hawai Retrieved from the Internet:URL:http://www.embassi.de/publi/veroeffent/Froeba.pdf > [retrieved on Oct. 23, 2007]", Dept. of Applied Electronics, Proceedings of lasted "Signal and Image Processing", 2002, pp. 1-6.

Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.

Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.

Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, Xinwen et al., "Direct Appearance Models", IEEE, 2001, pp. I-828-I-833.

Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.

Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.

Jones, M et al., "Fast multi-view face detection, http://www.merl.com/papers/docs/TR2003-96.pdf", Mitsubishi Electric Research Lab, 2003, 10 pgs.

Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st International Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proceedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cvpr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf", Pattern Recognition, 2001, pp. 95-109, vol. 34.

Lei et al., "A CBIR Method Based on Color-Spatial Feature", IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Non-Final Office Action mailed Aug 19, 2009, for U.S. Appl. No. 11/773,815, filed Jul. 5, 2007.

Non-Final Office Action mailed Aug 20, 2009, for U.S. Appl. No. 11/773,855, filed Jul. 5, 2007.

Non-Final Office Action mailed Jan. 20, 2010, for U.S. Appl. No. 12/262,024, filed Oct. 30, 2008.

Non-Final Office Action mailed Sep. 08, 2009, for U.S. Appl. No. 11/688,236, filed Mar. 19, 2007.

Non-Final Office Action mailed Sep. 28, 2010, for U.S. Appl. No. 11/752,925, filed May 24, 2007.

Nordstrom, M.M. et al., "The IMM face database an annotated dataset of 240 face images, http://www2.imm.dtu.dk/pubdb/p.php?3160", Informatics and Mathematical Modelling, 2004.

Notice of Allowance mailed Jan. 5, 2011, for U.S. Appl. No. 11/752,925, filed May 24, 2007.

Notice of Allowance mailed Sep. 28, 2009, for U.S. Appl. No. 12/262,037, filed Oct. 30, 2008.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT International Search Report and the Written Opinion of the International Searching Authority, for PCT Application No. PCT/US2007/0069593, dated Sep. 16, 2008, 4 pages.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

Reinhold Huber, et al., "Adaptive Aperture Control for Image Acquisition", Sixth IEEE Workshop on Applications of Computer Vision, 2002, Abstract printed from http://csdl.computer.org/comp/proceedings/wacv/2002/1858/00/18580320abs.htm.

Romdhani, S. et al., "Face Identification by Fitting a 3D Morphable Model using linear Shape and Texture Error Functions, XP003018283", European Conference on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998, pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Sim, T. et al., "The Cmu Pose, Illumination, and Expression (PIE) Database of Human Faces Robotics Institute, Tech. Report, CMU-RI-TR-01-02", 2001, 18 pgs, Carnegie Mellon University.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Soriano, M. et al., "Making Saturated Facial Images Useful Again, XP002325961, ISSN: 0277-786X", Proceedings of the SPIE, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann, M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd International Conference on Information Technology for Application, 2004, pp. 305-310.

Tkalcic, M. et al., "Colour spaces perceptual, historical and applicational background, ISBN: 0-7803-7763-X", IEEE, EUROCON, 2003, pp. 304-308, vol. 1.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research & Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621&coll=GUIDE&dl=GUIDE&CFID=680-9268&CFTOKEN=82843223.", IEEE Transactions on Pattern Analysis and Machine Intelligence archive, 2002, pp. 34-58, vol. 24—Issue 1, IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: a literature survey, ISSN: 0360-0300, http://portal.acm.org/citation.cfm?id=954342&coll=GUIDE&dl=GUIDE&CFID=680-9268&CFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

Patent Abstracts of Japan, publication No. 09-212620, publication date: Aug. 15, 1997, for: Manufacture of Face Image.

Patent Abstracts of Japan, publication No. 2007-087234, publication date: Apr. 5, 2007, for: Image Processing Method and Apparatus, and Program.

Paul Viola and Michael Jones: Robust Real-Time Object Detection, International Journal of Computer Vision, Kluwer Academic Publishers, vol. 57, No. 2, 2004, pp. 137-154.

Paul Viola and Michael Jones: Rapid Object Detection Using a Boosted Cascade of Simple Features, IEEE, 2001, pp. I-511-I-518.

Final Rejection, dated Nov. 30, 2012, for U.S. Appl. No. 13/034,707, filed Feb. 25, 2011.

* cited by examiner

IMAGE PROCESSING METHOD AND APPARATUS

PRIORITY

This application is a Continuation of U.S. patent application Ser. No. 13/034,707, filed Feb. 25, 2011; which is a Continuation of U.S. patent application Ser. No. 11/752,925, filed May 24, 2007, now U.S. Pat. No. 7,916,971; which is hereby incorporated by reference.

BACKGROUND

The present invention relates to an image processing method and apparatus. One of the most common reasons for an acquired digital photograph to be discarded or spoiled is because one or more of the facial regions in the photograph suffer from photographic defects other than red-eye defects, even though red eye defects can be common in cameras not operating with the advantages of the techniques described, e.g., at U.S. Pat. No. 6,407,777, and at US published applications nos. 2005/0140801, 2005/0041121, 2006/0093212, and 2006/0204054, which are assigned to the same assignee and hereby incorporated by reference. Common examples occur when people move or shake their head; when someone closes their eyes or blinks or someone yawns. Where there are several faces in a photograph, it is sufficient for one face to be "defective" for the whole shot to be spoiled. Although digital cameras allow users to quickly shoot several pictures of the same scene. Typically, such cameras do not provide warnings of facial errors, nor provide a way to correct for such errors without repeating the composition stages (i.e. getting everyone together again in a group) of taking the photograph and re-shooting the scene. This type of problem is particularly difficult with children who are often photographed in unusual spontaneous poses which cannot be duplicated. When such a shot is spoiled because the child moved their head at the moment of acquisition, it is very disappointing for the photographer.

U.S. Pat. No. 6,301,440, which is incorporated by reference, discloses an image acquisition device wherein the instant of exposure is controlled by image content. When a trigger is activated, the image proposed by the user is analysed and imaging parameters are altered to obtain optimum image quality before the device proceeds to take the image. For example, the device could postpone acquisition of the image until every person in the image is smiling.

SUMMARY OF THE INVENTION

An image processing method is provided including acquiring a main image of a scene. One or more facial regions are determined in the main image. The one or more main image facial regions are analyzed for defects and one or more are determined to be defective. A sequence of relatively low resolution images nominally of the scene are acquired. One or more sets of low resolution facial regions in the sequence are analyzed to determine one or more that correspond to a defective main image facial region. At least a portion of the defective main image facial region is corrected with image information from one or more corresponding low resolution facial regions not including a same defect as said portion of said defective main image facial region.

The sequence of low resolution images may be specifically acquired for a time period not including a time for acquiring the main image. The method may also include combining defect-free low resolution facial regions into a combined image, and correcting at least the portion of the defective main image facial region with image information from the combined image.

Another image processing method is provided that including acquiring a main image of a scene. One or more facial regions in the main image are determined, and analyzed to determine if any are defective. A sequence of relatively low resolution images is acquired nominally of the scene for a time period not including a time for acquiring the main image. One or more sets of low resolution facial regions are determined in the sequence of low resolution images. The sets of facial regions are analyzed to determine if any facial regions of a set corresponding to a defective facial region of the main image include a defect. Defect free facial regions of the corresponding set are combined to provide a high quality defect free facial region. At least a portion of any defective facial regions of said main image are corrected with image information from a corresponding high quality defect free facial region.

The time period may include one or more of a time period preceding or a time period following the time for acquiring the main image. The correcting may include applying a model including multiple vertices defining a periphery of a facial region to each high quality defect-free facial region and a corresponding defective facial region. Pixels may be mapped of the high quality defect-free facial region to the defective facial region according to the correspondence of vertices for the respective regions. The model may include an Active Appearance Model (AAM).

The main image may be acquired at an exposure level different to the exposure level of the low resolution images. The correcting may include mapping luminance levels of the high quality defect free facial region to luminance levels of the defective facial region.

Sets of low resolution facial regions from the sequence of low resolution images may be stored in an image header file of the main image.

The method may include displaying the main image and/or corrected image, and selected actions may be user-initiated.

The analyzing of the sets may include, prior to the combining in the second method, removing facial regions including faces exceeding an average size of faces in a set of facial regions by a threshold amount from said set of facial regions, and/or removing facial regions including faces with an orientation outside an average orientation of faces in a set of facial regions by a threshold amount from said set of facial regions.

The analyzing of sets may include the following:
applying an Active Appearance Model (AAM) to each face of a set of facial regions;
analyzing AAM parameters for each face of the set of facial regions to provide an indication of facial expression; and
prior to the combining in the second method, removing faces having a defective expression from the set of facial regions.

The analyzing of sets may include the following:
applying an Active Appearance Model (AAM) to each face of a set of facial regions;
analysing AAM parameters for each face of the set of facial regions to provide an indication of facial orientation; and
prior to said combining in the second method, removing faces having an undesirable orientation from said set of facial regions.

The analyzing of facial regions may include applying an Active Appearance Model (AAM) to each facial region, and analyzing AAM parameters for each facial region to provide an indication of facial expression, and/or analyzing each facial region for contrast, sharpness, texture, luminance levels or skin color or combinations thereof, and/or analyzing each facial region to determine if an eye of the facial region is closed, if a mouth of the facial region is open and/or if a mouth of the facial region is smiling.

The method may be such that the correcting, and the combining in the second method, only occur when the set of facial regions exceeds a given number. The method may also include resizing and aligning faces of the set of facial regions, and the aligning may be performed according to cardinal points of faces of the set of facial regions.

The correcting may include blending and/or infilling a corrected region of the main image with the remainder of the main image.

BRIEF DESCRIPTION OF THE DRAWINGS

Embodiments will now be described, by way of example, with reference to the accompanying drawings, in which.

DETAILED DESCRIPTION OF THE PREFERRED EMBODIMENTS

Certain embodiments can be implemented with a digital camera which incorporates (i) a face tracker operative on a preview image stream; (ii) a super-resolution processing module configured to create a higher resolution image from a composite of several low-resolution images; and (iii) a facial region quality analysis module for determining the quality of facial regions.

Preferably, super-resolution is applied to preview facial regions extracted during face tracking.

The embodiments enable the correction of errors or flaws in the facial regions of an acquired image within a digital camera using preview image data and employing super-resolution techniques.

Figure 1:
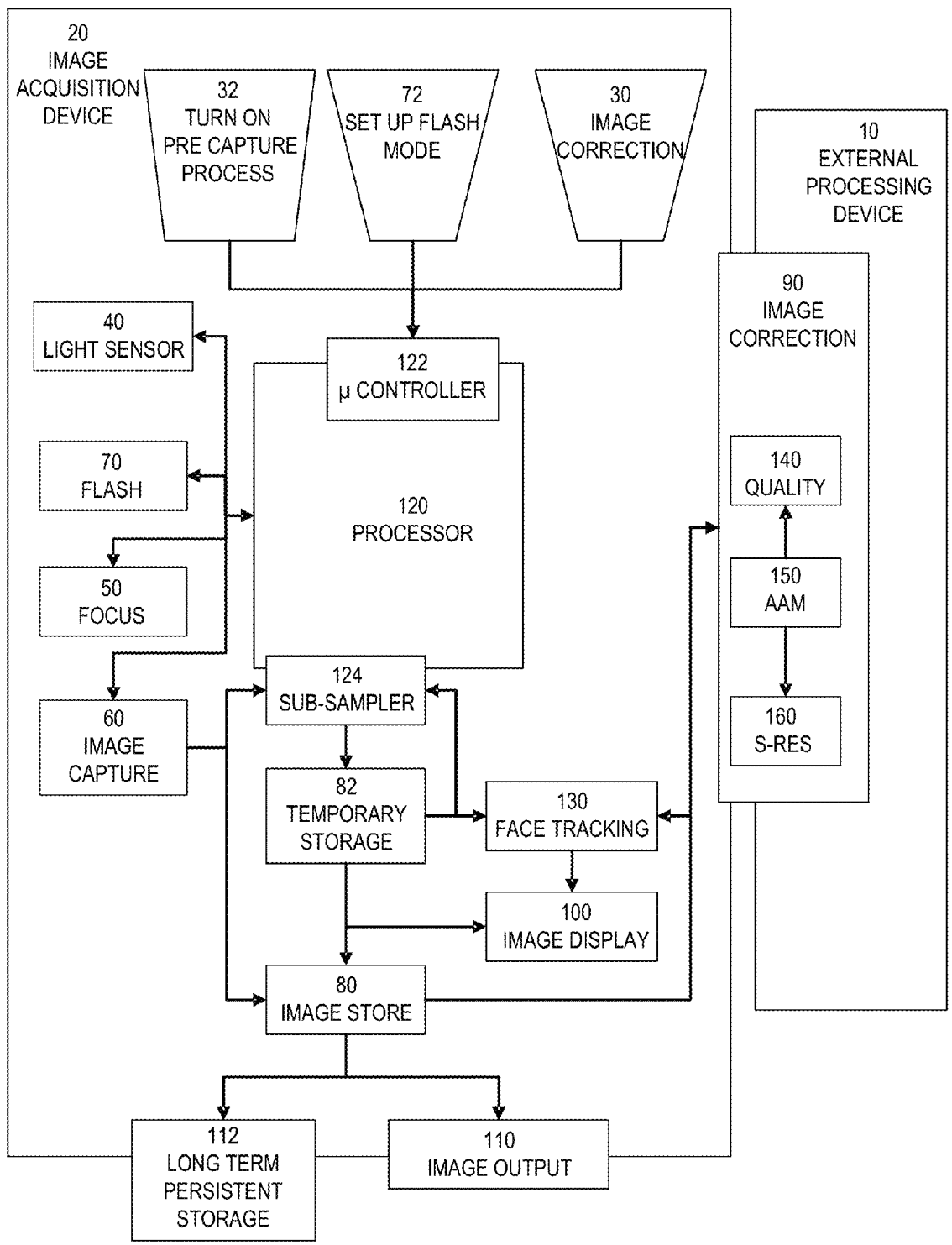
FIG. 1 is a block diagram of an image processing apparatus operating in accordance with an embodiment of the present invention.

FIG. 1 is a block diagram of an image acquisition device 20, which in the present embodiment is a portable digital camera, operating in accordance with certain embodiments. It will be appreciated that many of the processes implemented in the digital camera are implemented in or controlled by software operating on a microprocessor, central processing unit, controller, digital signal processor and/or an application specific integrated circuit, collectively depicted as processor 120. All user interface and control of peripheral components such as buttons and display is controlled by a microcontroller 122.

In operation, the processor 120, in response to a user input at 122, such as half pressing a shutter button (pre-capture mode 32), initiates and controls the digital photographic process. Ambient light exposure is determined using a light sensor 40 in order to automatically determine if a flash is to be used. The distance to the subject is determined using a focusing mechanism 50 which also focuses the image on an image capture device 60. If a flash is to be used, processor 120 causes a flash device 70 to generate a photographic flash in substantial coincidence with the recording of the image by the image capture device 60 upon full depression of the shutter button. The image capture device 60 digitally records the image in colour. The image capture device is known to those familiar with the art and may include a CCD (charge coupled device) or CMOS to facilitate digital recording. The flash may be selectively generated either in response to the light sensor 40 or a manual input 72 from the user of the camera. The high resolution image recorded by image capture device 60 is stored in an image store 80 which may comprise computer memory such a dynamic random access memory or a non-volatile memory. The camera is equipped with a display 100, such as an LCD, both for displaying preview images and displaying a user interface for camera control software.

In the case of preview images which are generated in the pre-capture mode 32 with the shutter button half-pressed, the display 100 can assist the user in composing the image, as well as being used to determine focusing and exposure. Temporary storage 82 is used to store one or plurality of the stream of preview images and can be part of the image store 80 or a separate component. The preview image is usually generated by the image capture device 60. For speed and memory efficiency reasons, preview images usually have a lower pixel resolution than the main image taken when the shutter button is fully depressed, and are generated by sub-sampling a raw captured image using software 124 which can be part of the general processor 120 or dedicated hardware or combination thereof.

In the present embodiment, a face detection and tracking module 130 such as described in U.S. application Ser. No. 11/464,083, filed Aug. 11, 2006, which is hereby incorporated by reference, is operably connected to the sub-sampler 124 to control the sub-sampled resolution of the preview images in accordance with the requirements of the face detection and tracking module. Preview images stored in temporary storage 82 are available to the module 130 which records the locations of faces tracked and detected in the preview image stream. In one embodiment, the module 130 is operably connected to the display 100 so that boundaries of detected and tracked face regions can be superimposed on the display around the faces during preview.

In the embodiment of FIG. 1, the face tracking module 130 is arranged to extract and store tracked facial regions at relatively low resolution in a memory buffer such as memory 82 and possibly for storage as meta-data in an acquired image header stored in memory 80. Where multiple face regions are tracked, a buffer is established for each tracked face region. These buffers are of finite size (10-20 extracted face regions in a preferred embodiment) and generally operate on a first-in-first-out (FIFO) basis.

According to the preferred embodiment, the device 20 further comprises an image correction module 90. Where the module 90 is arranged for off-line correction of acquired images in an external processing device 10, such as a desktop computer, a colour printer or a photo kiosk, face regions detected and/or tracked in preview images are preferably stored as meta-data within the image header. However, where the module 90 is implemented within the camera 20, it can have direct access to the buffer 82 where preview images and/or face region information is stored.

In this embodiment, the module 90 receives the captured high resolution digital image from the store 80 and analyzes it to detect defects. The analysis is performed as described in the embodiments to follow. If defects are found, the module can modify the image to remove the defect. The modified image may be either displayed on image display 100, saved on a persistent storage 112 which can be internal or a removable storage such as CF card, SD card or the like, or downloaded to another device via image output means 110 which can be tethered or wireless. The module 90 can be brought into operation either automatically each time an image is captured, or upon user demand via input 30. Although illustrated as a separate item, where the module 90 is part of the camera, it may be implemented by suitable software on the processor 120.

The main components of the image correction module include a quality module 140 which is arranged to analyse face regions from either low or high resolution images to determine if these include face defects. A super-resolution module 160 is arranged to combine multiple low-resolution face regions of the same subject generally with the same pose and a desirable facial expression to provide a high quality face region for use in the correction process. In the present embodiment, an active appearance model (AAM) module 150 produces AAM parameters for face regions again from either low or high resolution images.

AAM modules are well known and a suitable module for the present embodiment is disclosed in "Fast and Reliable Active Appearance Model Search for 3-D Face Tracking", F Dornaika and J Ahlberg, IEEE Transactions on Systems, Man, and Cybernetics-Part B: Cybernetics, Vol. 34, No. 4, pg 1838-1853, August 2004, although other models based on the original paper by T F Cootes et al "Active Appearance Models" Proc. European Conf. Computer Vision, 1998, pp 484-498 could also be employed.

The AAM module 150 can preferably cooperate with the quality module 140 to provide pose and/or expression indicators to allow for selection of images in the analysis and optionally in the correction process described below. Also, the AAM module 150 can preferably cooperate with the super-resolution module 160 to provide pose indicators to allow for selection of images in the correction process, again described in more detail below.

Figure 2:
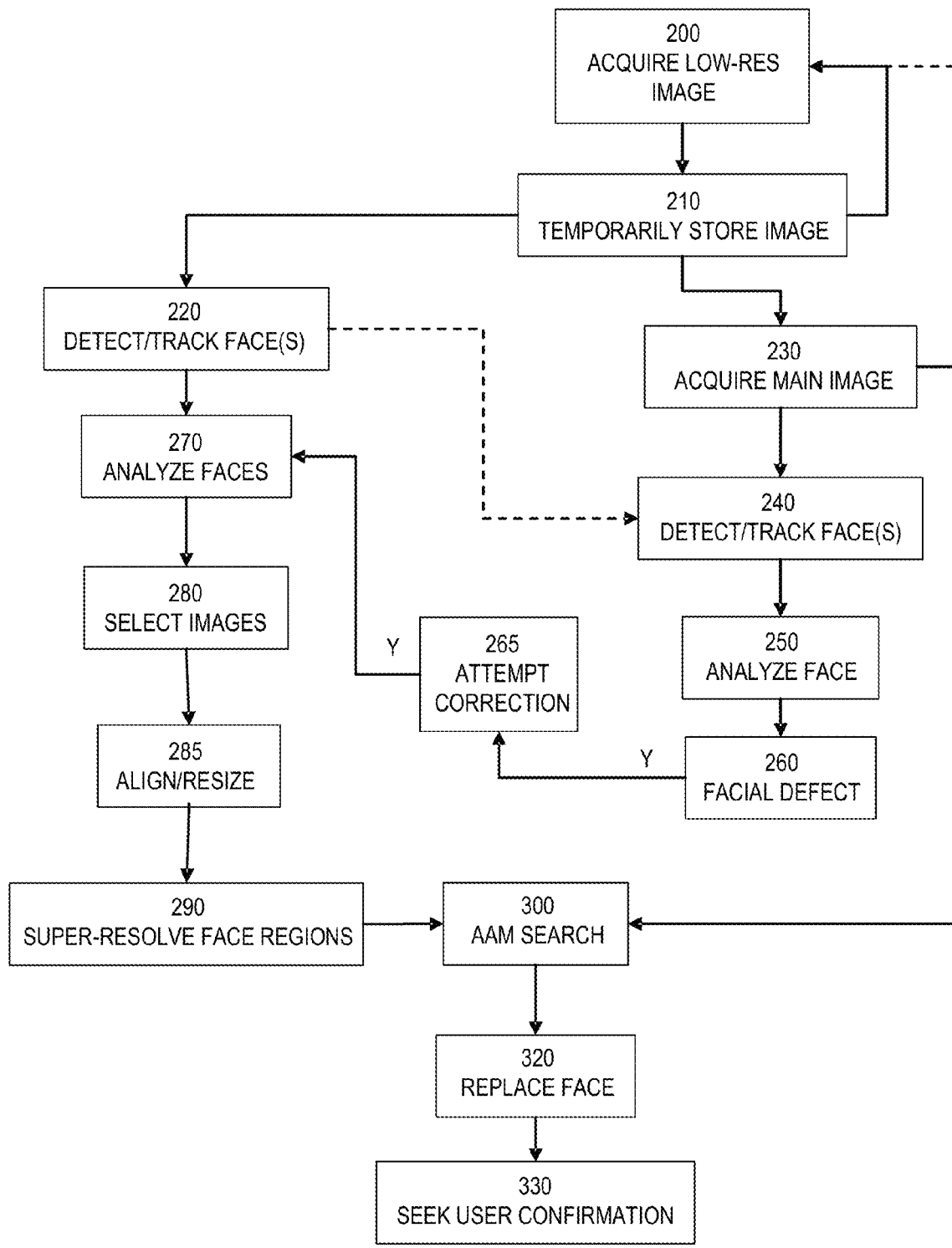
FIG. 2 is a flow diagram of an image processing method according to a preferred embodiment of the present invention.

Referring now to FIG. 2, which illustrates an exemplary processing flow for certain embodiments, when a main image is acquired, step 230, the location and size of any detected/tracked face region(s) in the main acquired image (high resolution) will be known by the module 90 from the module 130. Face detection can either be applied directly on the acquired image and/or information for face regions previously detected and/or tracked in the preview stream can be used for face detection in the main image (indicated by the dashed line extending from step 220). At step 250, the facial region quality analysis module 140 extracts and analyzes face regions tracked/detected at step 240 in the main image to determine the quality of the acquired face regions. For example, the module 140 can apply a preliminary analysis to measure the overall contrast, sharpness and/or texture of detected face region(s). This can indicate if the entire face region was blurred due to motion of the subject at the instant of acquisition. If a facial region is not sufficiently well defined then it is marked as a blur defect. In additional or alternatively, another stage of analysis can focus on the eye region of the face(s) to determine if one, or both eyes were fully or partially closed at the instant of acquisition and the face region is categorized accordingly. As mentioned previously, if AAM analysis is performed on the image, then the AAM parameters can be used to indicate whether a subject's eyes are open or not. It should be noted that in the above analyses, the module 90 detects blink or blur due to localized movement of the subject as opposed to global image blur.

Another or alternative stage of analysis focuses on the mouth region and determines if the mouth is opened in a yawn or indeed not smiling; again the face region is categorized accordingly. As mentioned previously, if AAM analysis is performed on the image, then the AAM parameters can be used to indicate the state of a subject's mouth.

Other exemplary tests might include luminance levels, skin colour and texture histograms, abrupt facial expressions (smiling, frowning) which may cause significant variations in facial features (mouth shape, furrows in brow). Specialized tests can be implemented as additional or alternative image analysis filters, for example, a Hough transform filter could be used to detect parallel lines in a face region above the eyes indicating a "furrowed brow". Other image analysis techniques such as those known in the art and as disclosed in U.S. Pat. No. 6,301,440 can also be employed to categorise the face region(s) of the main image.

After this analysis, it is decided (for each face region) if any of these defects occurred, step 260, and the camera or external processing device user can be offered the option of repairing the defect based on the buffered (low resolution) face region data, step 265.

When the repair option is actuated by the user, each of the low-resolution face regions is first analyzed by the face region quality analyzer, step 270. As this analysis is operative on lower resolution images acquired and stored at steps 200/210, the analysis may vary from the analysis of face regions in the main acquired image at step 250. Nevertheless the analysis steps are similar in that each low-resolution face region is analyzed to determine if it suffers from image defects in which case it should not be selected at step 280 to reconstruct the defective face region(s) in the main image. After this analysis and selection, if there are not enough "good" face regions corresponding to a defective face region available from the stream of low-resolution images, an indication is passed to the user that image repair is not viable. Where there are enough "good" face regions, these are passed on for resizing and alignment, step 285.

This step re-sizes each face region and performs some local alignment of cardinal face points to correct for variations in pose and to ensure that each of the low-resolution face regions overlap one another as uniformly as is practical for later processing.

It should also be noted that as these image regions were captured in sequence and over a relatively short duration, it is expected that they are of approximately the same size and orientation. Thus, image alignment can achieved using cardinal face points, in particular those relating to the eyes, mouth, lower face (chin region) which is normally delineated by a distinct boundary edge, and the upper face which is normally delineated by a distinctive hairline boundary. Some slight scaling and morphing of extracted face regions may be used to achieve reasonable alignment, however a very precise alignment of these images is not desirable as it would undermine the super-resolution techniques which enable a higher resolution image to be determined from several low-resolution images.

It should be noted that the low-resolution images captured and stored at steps 200/210 can be captured either from a time period before capturing the main image or from a period following capture of the main image (indicated by the dashed line extending from step 230). For example, it may be possible to capture suitable defect free low resolution images in a period immediately after a subject has stopped moving/blinking etc following capture of the main image.

This set of selected defect free face regions is next passed to a super-resolution module 160 which combines them using known super-resolution methods to yield a high resolution face region which is compatible with a corresponding region of the main acquired image.

Now the system has available to it, a high quality defect-free combination face region and a high resolution main image with a generally corresponding defective face region.

If this has not already been performed for quality analysis, the defective face region(s) as well as the corresponding high quality defect-free face region are subjected to AAM analysis, step 300. Referring now to FIG. 3(a) to (d), which illustrates some images including face regions which have been processed by the AAM module 150. In this case, the model represented by the wire frame superimposed on the face is tuned for a generally forward facing and generally upright face, although separate models can be deployed for use with inclined faces or faces in profile. Once the model has been applied, it returns a set of coordinates for the vertices of the wire frame; as well as texture parameters for each of the triangular elements defined by adjacent vertices. The relative coordinates of the vertices as well as the texture parameters can in turn provide indicators linked to the expression and inclination of the face which can be used in quality analysis as mentioned above.

It will therefore be seen that the AAM module 150 can also be used in the facial region analysis steps 250/270 to provide in indicator of whether a mouth or eyes are open i.e. smiling and not blinking; and also to help determine in steps 285/290 implemented by the super-resolution module 160 whether facial regions are similarly aligned or inclined for selection before super-resolution.

Figure 3:
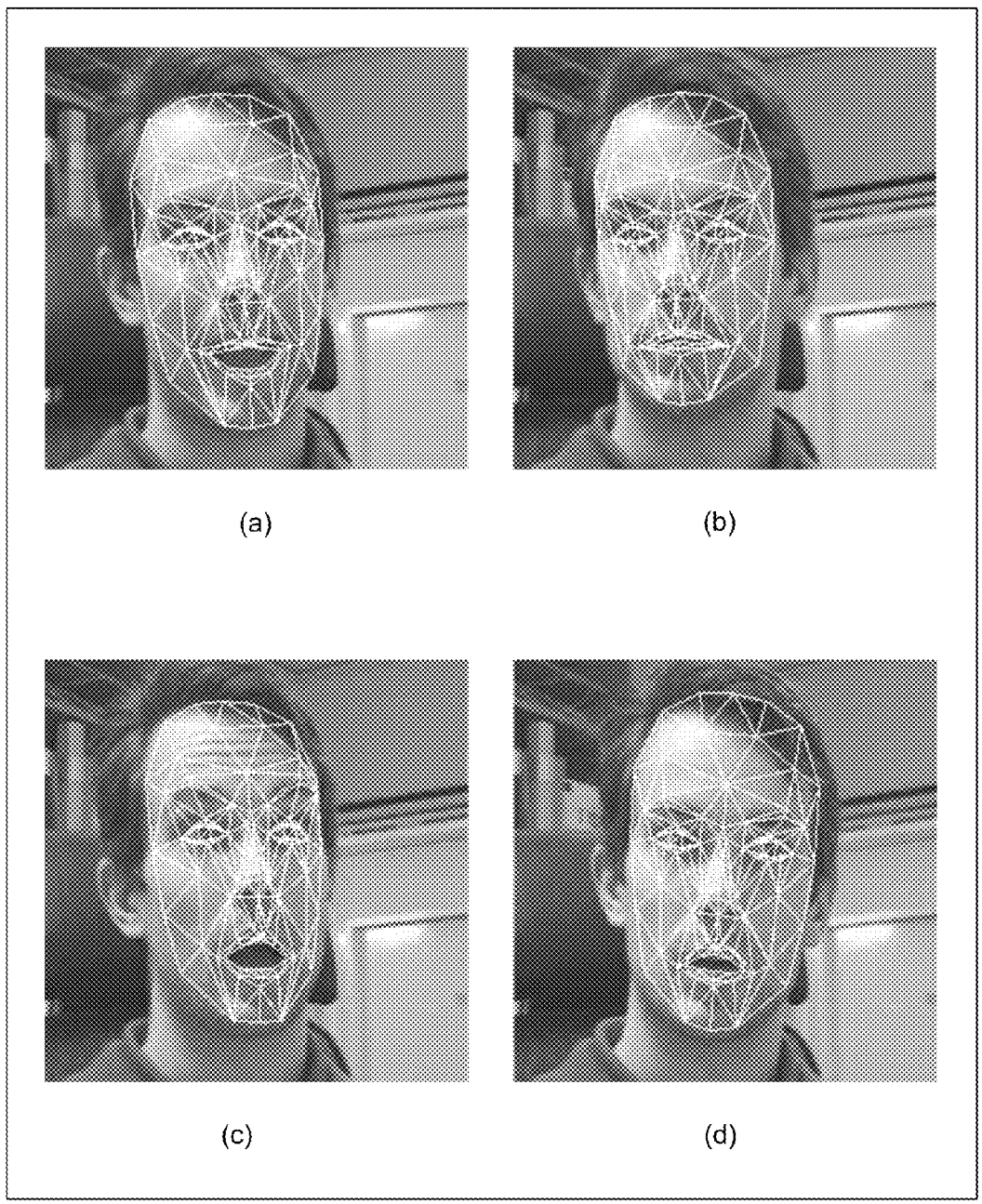
FIGS. 3 and 4 show exemplary sets of images to which an active appearance model has been applied.

So, using FIG. 3(a) as an example of a facial region produced by super-resolution of low resolution images, it is observed that the set of vertices comprising the periphery of the AAM model define a region which can be mapped on to corresponding set of peripheral vertices of FIG. 3(b) to FIG. 3(d) where these images have been classified and confirmed by the user as defective facial regions and candidates for correction.

Figure 4:
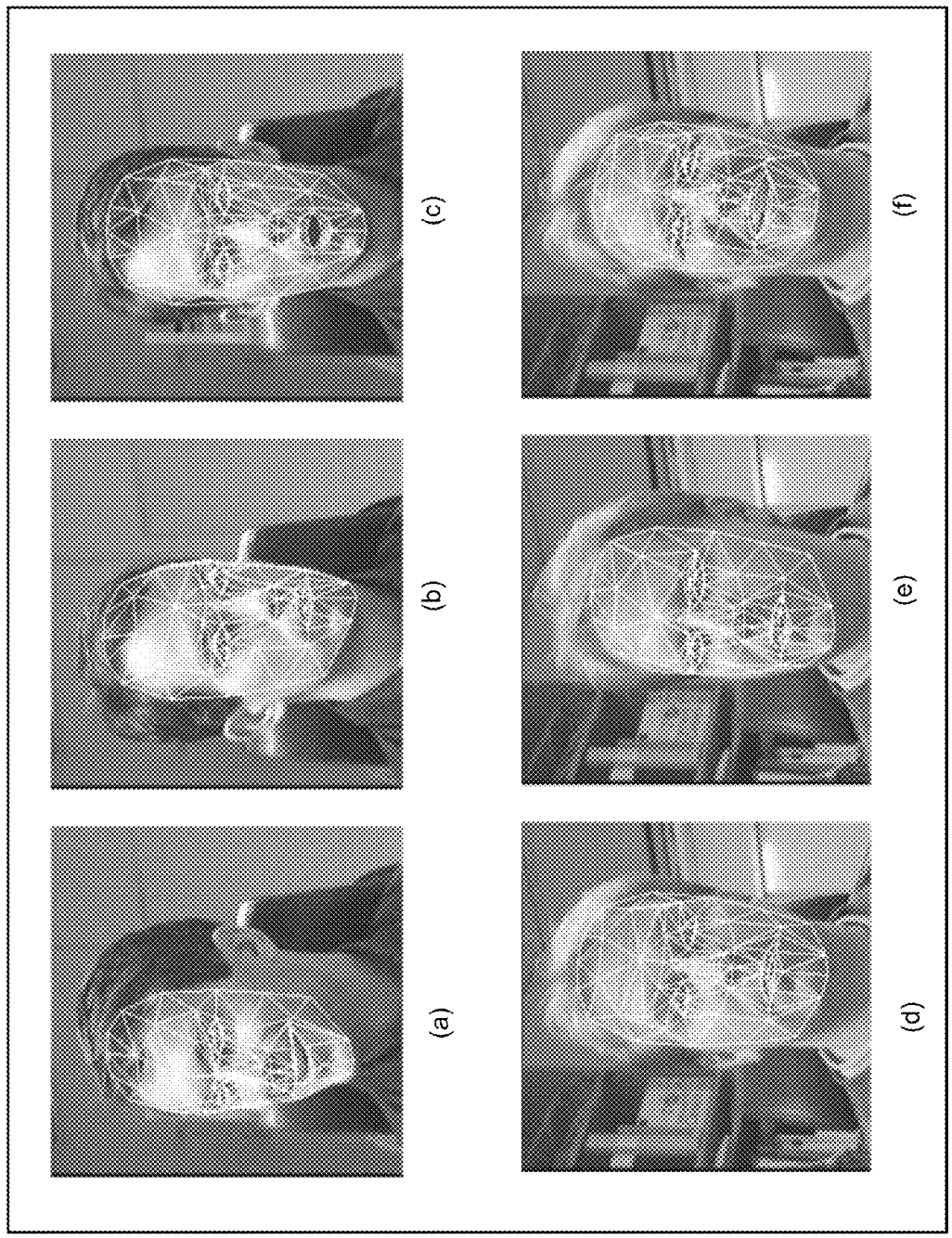

In relation to FIG. 4, the model parameters for FIG. 4(a) or 4(b) which might represent super-resolved defect free face regions could indicate that the left-right orientation of these face regions would not make them suitable candidates for correcting the face region of FIG. 4(c). Similarly, the face region of FIG. 4(f) could be a more suitable candidate than the face region of FIG. 4(e) for correcting the face region of FIG. 4(d).

In any case, if the super-resolved face region is deemed to be compatible with the defective face region, information from the super-resolved face region can be pasted onto the main image by any suitable technique to correct the face region of the main image, step 320. The corrected image can be viewed and depending on the nature of the mapping, it can be adjusted by the user, before being finally accepted or rejected, step 330. So for example, where dithering around the periphery of the corrected face region is used as part of the correction process, step 320, the degree of dithering can be adjusted. Similarly, luminance levels or texture parameters in the corrected regions can be manually adjusted by the user, or indeed any parameter of the corrected region and the mapping process can be manually adjusted prior to final approval or rejection by the user.

While AAM provides one approach to determine the outside boundary of a facial region, other well-known image processing techniques such as edge detection, region growing and skin color analysis may be used in addition or as alternatives to AAM. However, these may not have the advantage of also being useful in analysing a face region for defects and/or for pose information. Other techniques which can prove useful include applying foreground/background separation to either the low-resolution images or the main image prior to running face detection to reduce overall processing time by only analysing foreground regions and particularly foreground skin segments. Local colour segmentation applied across the boundary of a foreground/background contour can assist in further refining the boundary of a facial region.

Once the user is satisfied with the placement of the reconstructed face region they may choose to merge it with the main image; alternatively, if they are not happy they can cancel the reconstruction process. These actions are typically selected through buttons on the camera user interface where the correction module is implemented on the acquisition device 20.

As practical examples let us consider an example of the system used to correct an eye defect. An example may be used of a defect where one eye is shut in the main image frame due to the subject "blinking" during the acquisition. Immediately after the main image acquisition the user is prompted to determine if they wish to correct this defect. If they confirm this, then the camera begins by analyzing a set of face regions stored from preview images acquired immediately prior to the main image acquisition. It is assumed that a set of, say, 20 images was saved from the one second period immediately prior to image acquisition. As the defect was a blinking eye, the initial testing determines that the last, say, 10 of these preview images are not useful. However the previous 10 images are determined to be suitable. Additional testing of these images might include the determination of facial pose, eliminating images where the facial pose varies more than 5% from the averaged pose across all previews; a determination of the size of the facial region, eliminating images where the averaged size varies more than 25% from the averaged size across all images. The reason the threshold is higher for the latter test is that it is easier to rescale face regions than to correct for pose variations.

In variations of the above described embodiment, the regions that are combined may include portions of the background region surrounding the main face region. This is particularly important where the defect to be corrected in the main acquired image is due to face motion during image exposure. This will lead to a face region with a poorly defined outer boundary in the main image and the super-resolution image which is superimposed upon it typically incorporates portions of the background for properly correcting this face motion defect. A determination of whether to include background regions for face reconstruction can be made by the user, or may be determined automatically after a defect analysis is performed on the main acquired image. In the latter case, where the defect comprises blurring due to face motion, then background regions will normally be included in the super-resolution reconstruction process. In an alternative embodiment, a reconstructed background can be created using either (i) region infilling techniques for a background region of relatively homogeneous colour and texture characteristics, or (ii) directly from the preview image stream using image alignment and super-resolution techniques. In the latter case the reconstructed background is merged into a gap in the main image background created by the separation of foreground from background; the reconstructed face region is next merged into the separated foreground region, specifically into the facial region of the foreground and finally the foreground is re-integrated with the enhanced background region.

After applying super-resolution methods to create a higher resolution face region from multiple low-resolution preview images, some additional scaling and alignment operations are normally involved. Furthermore, some blending, infilling and morphological operations may be used in order to ensure a smooth transition between the newly constructed super-resolution face region and the background of the main acquired image. This is particularly the case where the defect to be corrected is motion of the face during image exposure. In the case of motion defects it may also be desirable to reconstruct portions of the image background prior to integration of the reconstructed face region into the main image.

It is also be desirable to match the overall luminance levels of the new face region with that of the old face region, and this is best achieved through a matching of the skin colour between the old region and the newly constructed one. Preview images are acquired under fixed camera settings and can be over/under exposed. This may not be fully compensated for during the super-resolution process and may involve additional image processing operations.

While the above described embodiments have been directed to replacing face regions within an image, it will be seen that AAM can be used to model any type of feature of an image. So in certain embodiments, the patches to be used for super-resolution reconstruction may be sub-regions within a face region. For example, it may be desired to reconstruct only a segment of the face regions, such as an eye or mouth region, rather than the entire face region. In such cases, a determination of the precise boundary of the sub-region is of less importance as the sub-region will be merged into a surrounding region of substantially similar colour and texture (i.e. skin colour and texture). Thus, it is sufficient to center the eye regions to be combined or to align the corners of the mouth regions and to rely on blending the surrounding skin coloured areas into the main image.

In one or more of the above embodiments, separate face regions may be individually tracked (see also U.S. application Ser. No. 11/464,083, which is hereby incorporated by reference). Regions may be tracked from frame-to-frame. Preview or post-view face regions can be extracted, analyzed and aligned with each other and with the face region in the main or final acquired image. In addition, in techniques according to certain embodiments, faces may be tracked between frames in order to find and associate smaller details between previews or post-views on the face. For example, a left eye from Joe's face in preview N may be associated with a left eye from Joe's face in preview N+1. These may be used together to form one or more enhanced quality images of Joe's eye. This is advantageous because small features (an eye, a mouth, a nose, an eye component such as an eye lid or eye brow, or a pupil or iris, or an ear, chin, beard, mustache, forehead, hairstyle, etc. are not as easily traceable between frames as larger features (and their absolute or relative positional shifts between frames tend to be more substantial relative to their size.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections themselves, are hereby incorporated by reference into the detailed description of the preferred embodiments as disclosing alternative embodiments and components. The following are also incorporated by reference for this purpose: U.S. patent application Ser. Nos. 60/829,127, 60/804,546, 60/821,165 11/554, 539, 11/464,083, 11/027,001, 10/842,244, 11/024,046, 11/233,513, 11/460,218, 11/573,713, 11/319,766, 11/464, 083, 11/744,020 and 11/460,218, and U.S. published application no. 2006/0285754.

The invention claimed is:

1. An image processing method comprising:
using a processor-based image acquisition device;
acquiring a main image of a scene and two or more further images approximately of a same scene within a time period including said acquiring of said main image;
determining one or more regions of interest in said main image and said two or more further images, including temporarily storing two or more subsampled resolution images in a temporary storage directly from an image sensor, locating said one or more regions of interest within each of said two or more subsampled resolution images and predicting said one or more regions of interest within said main image based on the locating within the two or more temporarily stored subsampled resolution images;
analyzing said one or more regions of interest; and
determining to initiate a further action based on said analyzing of at least one region of interest, including
applying a model to said at least one region of interest;
analyzing one or more parameters of said model for said at least one region of interest to provide an indication that a characteristic of said at least one region of interest has at least a threshold value;
segmenting from said main image or said two or more further images, or both, said at least one region of interest;
comparing said at least one region of interest with at least one stored profile region also having at least said threshold value of said characteristic; and
initiating said further action based on said analyzing of said at least one region of interest and on said comparing.

2. A method according to claim 1 wherein said time period includes one or both of a time period just preceding or a time period just following said time for acquiring said main image.

3. A method according to claim 1 wherein said model comprises a plurality of vertices defining a periphery of the at least one region of interest, and said method comprises mapping pixels of said at least one stored profile region to said at least one region of interest according to a correspondence of vertices for said respective regions.

4. A method according to claim 3 wherein said model comprises an Active Appearance Model (AAM).

5. A method according to claim 1 wherein said main image is acquired at an exposure level different to the exposure level of said one or more further images and wherein said comparing comprises mapping luminance levels of said at least one stored profile region to luminance levels of said at least one region of interest.

6. A method according to claim 1 further comprising storing one or more of said further images in an image header file of said main image.

7. A method according to claim 1 further comprising: prior to said comparing, resizing and aligning one or both of said at least one region of interest and said at least one stored profile region.

8. An image acquisition and processing apparatus, comprising:
a lens and image sensor for acquiring a main image of a scene and two or more further images approximately of a same scene within a time period including said acquiring of said main image;

a processor; and a memory having code embedded therein for programming the processor to control the apparatus to perform an image processing method that comprises:

determining one or more regions of interest in said main image and said two or more further images, including temporarily storing two or more subsampled resolution images in a temporary storage directly from an image sensor, locating said one or more regions of interest within each of said two or more subsampled resolution images and predicting said one or more regions of interest within said main image based on the locating within the two or more temporarily stored subsampled resolution images;

analyzing said one or more regions of interest; and determining to initiate a further action based on said analyzing of at least one region of interest, including applying a model to said at least one region of interest;

analyzing one or more parameters of said model for said at least one region of interest to provide an indication that a characteristic of said at least one region of interest has at least a threshold value;

segmenting from said main image or said two or more further images, or both, said at least one region of interest;

comparing said at least one region of interest with at least one stored profile region also having at least said threshold value of said characteristic; and initiating said further action based on said analyzing of said at least one region of interest and on said comparing.

9. An apparatus according to claim 8, wherein said time period includes one or both of a time period just preceding or a time period just following said time for acquiring said main image.

10. An apparatus according to claim 8, wherein said model comprises a plurality of vertices defining a periphery of the at least one region of interest, and said method comprises mapping pixels of said at least one stored profile region to said at least one region of interest according to a correspondence of vertices for said respective regions.

11. An apparatus according to claim 10, wherein said model comprises an Active Appearance Model (AAM).

12. An apparatus according to claim 8, wherein said main image is acquired at an exposure level different to the exposure level of said one or more further images and wherein said comparing comprises mapping luminance levels of said at least one stored profile region to luminance levels of said at least one region of interest.

13. An apparatus according to claim 8, the method further comprising storing one or more of said further images in an image header file of said main image.

14. An apparatus according to claim 8, the method further comprising: prior to said comparing, resizing and aligning one or both of said at least one region of interest and said at least one stored profile region.

15. One or more non-transitory, processor-readable media having code embedded therein for programming a processor to control an image acquisition and processing apparatus to perform an image acquisition and processing method that comprises:

determining one or more regions of interest in said main image and said two or more further images, including temporarily storing two or more subsampled resolution images in a temporary storage directly from an image sensor, locating said one or more regions of interest within each of said two or more subsampled resolution images and predicting said one or more regions of interest within said main image based on the locating within the two or more temporarily stored subsampled resolution images;

analyzing said one or more regions of interest; and determining to initiate a further action based on said analyzing of at least one region of interest, including applying a model to said at least one region of interest;

analyzing one or more parameters of said model for said at least one region of interest to provide an indication that a characteristic of said at least one region of interest has at least a threshold value;

segmenting from said main image or said one two or more further images, or both, said at least one region of interest;

comparing said at least one region of interest with at least one stored profile region also having at least said threshold value of said characteristic; and initiating said further action based on said analyzing of said at least one region of interest and on said comparing.

16. One or more non-transitory, processor-readable media according to claim 15, wherein said time period includes one or both of a time period just preceding or a time period just following said time for acquiring said main image.

17. One or more non-transitory, processor-readable media according to claim 15, wherein said model comprises a plurality of vertices defining a periphery of the at least one region of interest, and said method comprises mapping pixels of said at least one stored profile region to said at least one region of interest according to a correspondence of vertices for said respective regions.

18. One or more non-transitory, processor-readable media according to claim 17, wherein said model comprises an Active Appearance Model (AAM).

19. One or more non-transitory, processor-readable media according to claim 15, wherein said main image is acquired at an exposure level different to the exposure level of said one or more further images and wherein said comparing comprises mapping luminance levels of said at least one stored profile region to luminance levels of said at least one region of interest.

20. One or more non-transitory, processor-readable media according to claim 19, the method further comprising storing one or more of said further images in an image header file of said main image.

21. One or more non-transitory, processor-readable media according to claim 15, the method further comprising: prior to said comparing, resizing and aligning one or both of said at least one region of interest and said at least one stored profile region.

* * * * *